Oct. 24, 1950 W. CULVER 2,527,244
ASSORTING SYSTEM
Filed Aug. 13, 1945 4 Sheets-Sheet 1

Fig.1

INVENTOR.
William Culver,
BY
David Mauly Heller
Attorney.

Oct. 24, 1950  W. CULVER  2,527,244
ASSORTING SYSTEM
Filed Aug. 13, 1945  4 Sheets-Sheet 2

INVENTOR.
William Culver
BY
Attorney.

Oct. 24, 1950 W. CULVER 2,527,244
ASSORTING SYSTEM
Filed Aug. 13, 1945 4 Sheets-Sheet 3

INVENTOR.
William Culver
BY
David Marly Heller
Attorney

Oct. 24, 1950 — W. CULVER — 2,527,244
ASSORTING SYSTEM
Filed Aug. 13, 1945 — 4 Sheets-Sheet 4

Patented Oct. 24, 1950

2,527,244

UNITED STATES PATENT OFFICE 2,527,244

ASSORTING SYSTEM

William Culver, Chicago, Ill.

Application August 13, 1945, Serial No. 610,555

8 Claims. (Cl. 104—88)

My invention relates to conveyor assorting systems in association with clips adapted to support a load to be conveyed, the said clips cooperating with selecting or assorting mechanism, so as to direct a load moved from an initial point on the conveyor system, and assorting like loads by directing them over one of a series of switching means, the said loads or material conveyed being diverted from a straight forward moving path to an angular path branching off from the said primary path, depending on the contactual engagement of the said clips with a particular assorting mechanism, and after the material has been switched off to the proper branch or track, means are provided for releasing the load or material carried by the clip or carrier element, the clip being ultimately pushed off the end of the track and collected in a receptacle for use and reuse once again.

An important object of my invention is to provide a primary conveyor system and a multiplicity of secondary conveyor systems angularly positioned with reference to the said primary conveyor system, each conveyor being equipped with pusher means which act in concert to be effectively pushed or to convey a unit either in a straight forward path or in a direction angularly positioned to the said straight forward path and parallel to the said secondary conveyor mechanism. In other words, at a common juncture the two conveyors act in concert to push an element or propel an element in a direction which may ultimately be directed angularly from a straight forward movement, causing the said element to be pushed either by the primary conveyor mechanism in a straight direction, or angularly by the secondary conveyor mechanism. For further elucidation, at a common point the two conveyor systems act in concert to effectively push an element, and if the element is subjected to diversion from its forward path by a selector mechanism, the primary and secondary conveyor systems will permit the said element to be pushed by either of them, that is to say, the element that is being pushed will be free to be selectively engaged by either the primary conveyor mechanism or the secondary conveyor mechanism.

Another object of my invention is to provide a series of clip elements adapted to ride on a system of trackage equipped with switching means at different points, the said switching means permitting the said clip elements to be directed to an angular course or direction from an intended straight path of travel, suitable switching means being contacted by the said clip element causing the track switch means to be rotated in order to carry with it the said clip element and direct it to an angularly positioned branch of trackage, ultimately the said clip element being provided with pin holding means which is ultimately acted upon by cam rail means causing disengagement of the pin means from the clip means, dropping the load at its destination.

A further object of my invention is to provide an assorting system wherein a main track means is connected to a series of angularly branched off track means, and common switching means disposed at the point of juncture between the main trackage means and the branch trackage means.

Another object of my invention is to provide trackage means, and combination clip means adapted to be motivated on said trackage means, the said clip means supporting releasably pin support means adapted to support materials thereupon, the said clip means being adapted to actuate pivotable arm switching means so that when the said clip means contacts the said rotatable arm switching means, the said arm switching means will actuate the track switching means diverting the directional movement of the said clip element or means to be conveyed or propelled to a branch of the trackage system, the trackage system thus diverting it from its intended straight forward movement on the primary trackage structure.

Another object of my invention is to provide an assorting system or mechanism consisting of a primary straight forward trackage unit, associated with a series of angularly positioned branch trackage structures, a common track switching means being employed to be in continuous alignment with the primary trackage structure, and adapted to be motivated to merge and be set up in alignment with a branch trackage system by means of a clip element conveyed on the said trackage system thru a conveyor means parallel to the primary trackage structure working in concert with a conveyor means, working in parallel relationship to a particular branch trackage structure, the clip element in its course of travel adapted to actuate a rotatable switch arm which is connected by suitable transmission means to the said track switching means causing the track switching means to be motivated angularly to break continuity with the primary track structure and to bridge the gap between the primary track structure and a branch track structure, the said clip element being moved along on the said branch track structure until it is engaged by cam rail means to effectively disengage the pin supporting structure therefrom, dropping the conveyed load and clip elements or means, and being further propelled and ultimately ejected from the track for reuse once again.

Another object of my invention is to provide a main trackage system associated with a multiplicity of branch trackage units or structures, a common switching means associated with the said primary track and said branch trackage structure, so as to selectively form a continuous path on the said primary trackage means, or deflection from the said primary trackage means to a particular branch trackage structure, the said track switching means being equipped with electrical contacts, a clip means adapted to travel over the said trackage unit provided with a bridging contact adapted to close the circuit between the said electrical contacts, causing electro-magnetic solenoid means to be actuated motivating the said track switch means carrying the said clip means, causing it to be rotated, and dual conveyor means adapted to motivate the said clip means in a direction governed by the position of the trackage switch means.

Another object of my invention is to provide selector clip means, which is equipped with delayed contact bridging means, so as to actuate electro-magnetic means after the said clip means has been positioned on track switching means on which it is being conveyed.

Another object of my invention is to provide clip means of the aforementioned character which has bridging contact means radially or adjustably positioned thereon so as to effectuate bridging contact with switch means equipped with electrical contacts placed at different positions on the said switch means.

Other objects and advantages resident in my invention will become apparent from an examination of the accompanying drawings, having special reference to the ensuing description, wherein like symbols are used to designate like parts, and in which.

My device is for use in laundries or dry cleaning establishments where items or materials of various colors, are, preferably, to be grouped in bundles, and conveyed to certain operating stations for functions to be performed on the said goods or material.

The object primarily is, to direct bundles from a common starting point by means of a trackage system working in concert with conveyor systems, by virtue of certain switching means to direct the said bundles or loads to be conveyed to different points of operation. For the purposes heretofore outlined, I have provided a distributing and assorting system consisting of trackage means in association with clip selector elements, and conveyor means for motivating the said clip selector elements which co-act with rotary switch arm means to deviate the movement of the said clip means from a primary trackage to an auxiliary or branch trackage.

One of the mechanisms employed for the foregoing objects and purposes consists of a main trackage 20 provided with a number of track switch means 22, 31, etc., the said track means cooperating with auxiliary or branch trackage 32 or 33, only two having been shown, although a multiplicity of such auxiliary branch trackage structures may be utilized, in fact as many as may be necessary in allocating materials and directing them towards the different stations of operation within a plant. The main trackage system 20 is associated with a propeller mechanism 12 which is mounted on sprockets or driving means 13 connected to a prime mover. The said conveyor 12 is preferably equipped with a series of pin-like elements called "pushers" 14 which are adapted to engage a surface of a clip selector element and motivate the same along the trackage system.

Each branch trackage 33 and 32 is angularly positioned with reference to the main trackage 20, and there is a gap between the said branch or auxiliary trackage and the primary trackage, the said gap being taken up by the switching means 31 and 22 which is pivotably positioned so as to effectuate either a continuous path of the trackage 20 or a break in that path and a merger of the trackage 20 with the trackage 33 or 32, preferably by engagement of the said switching means 31 or 22 and causing the same to be positioned so as to provide a path between the switching means 22 and the auxiliary branch track 32, or between the switching means 31 and the auxiliary branch 33, so that any clip selector element motivated on the track 20 will have a tendency to follow in a straight path over the switch means 22, the intermediate trackage section 29, the track switch means 31 and ultimately to the end of the trackage section designated 20.

With each of the auxiliary trackage sections 33, 32 or as many as there may be, there is associated a conveyor running parallel thereto and angularly positioned with respect to the propeller 12, the said propellers 15 and 17 also being provided with pusher elements or pins 19 and 18, respectively, the pusher elements being rotated so as to operate at the angular meeting point where the propellers are in angular relationship to operate in overlapping relationship, and to effectively push a clip element 40 along the track. As the conveyor unit diverges angularly, one set of pusher elements 14 or 19 or 18 continues to motivate the clip element 40 so that when the switch means 22 is in the position shown in full lines, the pusher elements 19 and 14, at the position indicated, will simultaneously tend to push the clip element 40 along, and until the clip selector element 40 travels along on the track switch means 22 far enough so as to be out of contact with the pusher elements 19, then the pusher elements 14 continue to propel the clip along. But when reaching the track switch means 31 if the clip selector element contacts and trips the rotatable switch arm 42, then the propeller 17 dominates and takes hold, the pusher pins 18 continuing to propel the clip selector element 40, yet when the said clip selector element 40 is out of the path of travel of the pusher elements 14, it is fully under control of the pusher elements 18 or 19, as the case may be.

It is to be noted that the switch means 22 and 31 are each provided with cut-out portions, namely the cut-out portion 24 is adapted to abut against the projection 23 on the track 20 so as to limit the motion of the switch means 22, and locate the same firmly in alignment with the remaining trackage, whereas the switch means 22 is also provided with a cut-out portion 27 to engage or abut against the projection 28 thus providing a fool-proof and positive means for locating and positioning the track switch means in co-extensive alignment in the trackage 20. The upper portion 25 is thus reduced in width by virtue of the cut-out portion 26 which is provided to abut against the projection 34 on the auxiliary trackage 32, when the switch means 22 is rotated from its position shown in full lines to that shown in dotted lines on Figure 1.

The trackage 20 which is fixed and its intermediate section 29 are supported by means of overhead supports 30, a sufficient number of those being used to support the trackage firmly in place.

Figures 2, 3, 4:
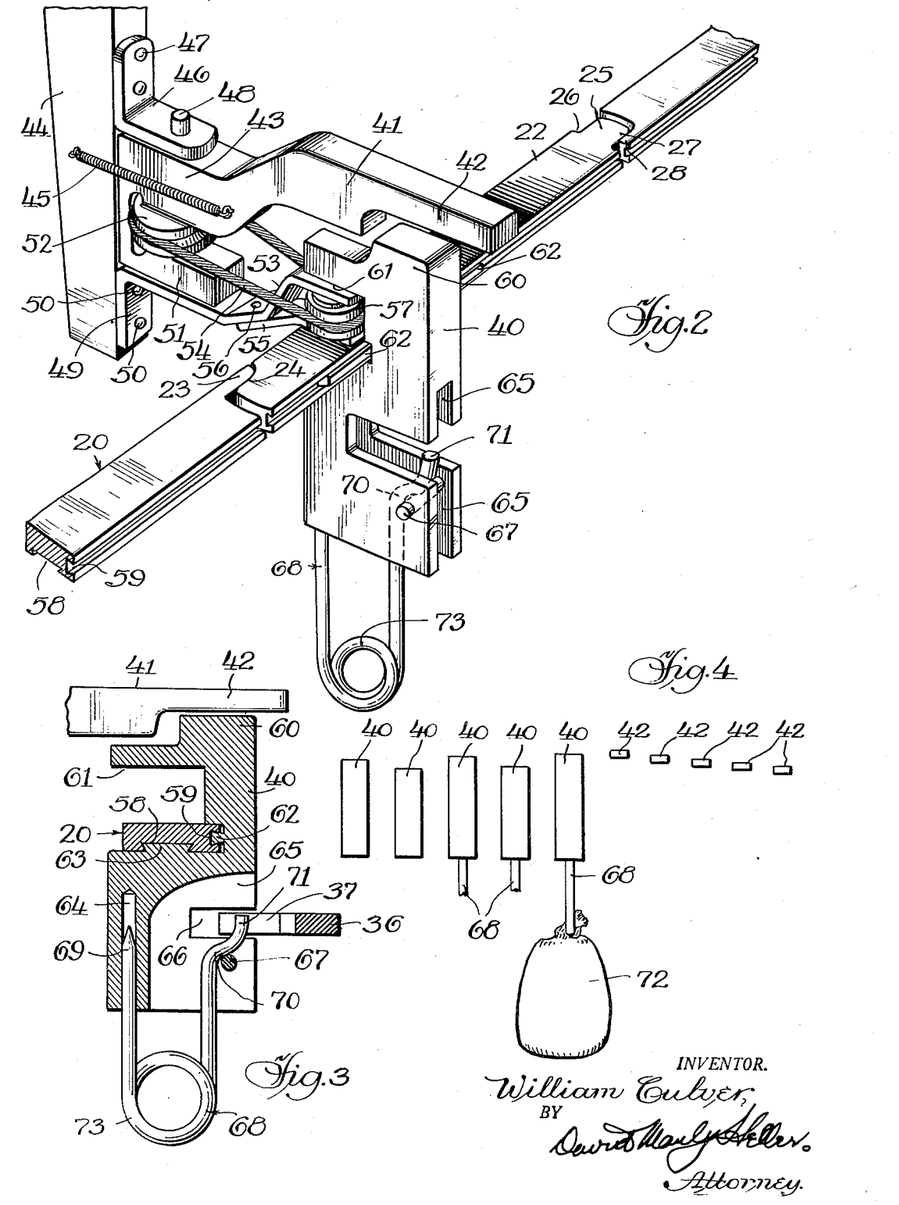
Fig. 2 is a perspective enlarged view of a clip element used in connection with my invention, and the rotating arm selector means which operates the switch means to direct the clip means from the primary track to a branch track structure.
Fig. 3 is a sectional view of the clip element showing the cam actuated pin release mechanism for freeing a pin support from its clip element.
Fig. 4 is a diagrammatic view showing how the rotatable switching arms are positioned at different heights beginning at the initial point of operation with the highest, and gradually going to the lowest position toward the end, so as to engage clip elements of different heights as indicated.

The clip selector element is best illustrated in Figures 2 and 3 where it is, generally, designated 40, and is provided with an upper contacting portion 60 adapted to either pass under the rotating arms 42 or to contact a particular arm 42 within its height range, for motivating the said arm. The clip selector element 40 is provided with a slotted portion 65 and a drilled hole 64 in order to accommodate the supporting pin 68 which has a sharp piercing point 69, a spring coiled section 73 and a hook terminus 70 which engages a supporting element 67, the supporting pins 68 being passed through the top neck portion of a bag 72 containing equipment or materials to be transported, the same being inserted as indicated in Figure 3, thus supporting the load 72 for transporting the same on the trackage.

The clip 40 is also provided with an open throat 61 and a dove-tail tongue 62 interiorly thereof, and at right angles thereto another dove-tail tongue 63 each engaging dove-tail grooves 59 and 58, respectively, on the trackage 20 or the track switches 22 and 31. On the track switch means I secure a pulley structure, more clearly shown in Figure 2, the said pulley structure being so secured as to motivate in unison with itself the switch means to an angular position as required.

Rotation is effectuated by means of the transmission belt 54 which is trained over a pulley 52, secured to function in unison with the rotatable switch arm 42, whenever it should be contacted by the extension on the clip 40 and moved arcuately. The rotatable switch arm 42 is provided with an intermediate section 41 which is alternately bent downwardly to form a V shaped housing of the portions 43 and 51 in order to house the pulley 52 mounted rotatably on the pivot stud 48 and fixed thereto. The pivot studs 48 operate rotatably in the bearings 46 and 49, the bearing 46 being attached by fastenings 47 to the upright support 44, a spring 45 being associated therewith, and having one of its ends secured to the upright 44, its other end being secured to the body portion 41 of the rotatable arm. It is the province of the spring 45 to maintain the rotatable switch arm 42 in the position shown in full lines Fig. 2.

The lower brackets or supports 49 are secured by means of rivets or screws 50 or other suitable fastening means and have an extension 53 which is bent upwardly in order to permit securing thereto a strap portion 55 by means of screws, or rivet fastenings 56, the portion 53 and the strap portion 55 forming a suitable housing for the pulley 57 which is adapted to rotate with it the track switch means 22 or 31.

The clip elements 40 are initially fed on to the track 20 at its initial point 21 (see Fig. 1) and then they are grabbed by the pusher pins 14 of the conveyor 12 and motivated along until an arm 42 is reached which is contacted by the section 60 of the respective clip selector element 40, as indicated in the schematic view of Figure 4, where it is to be noted that the rotatable switch arms 42 are positioned in a downwardly descending direction from the initial point toward the terminus of the track switching means 20, so that the lower-most clip will have to travel the entire distance of trackage 20 before it completes its travel, whereas the clip selector elements 40 having higher extensions 60 will contact the appropriate rotatable switch arms 42 motivating the same in order to deviate its path or course of travel on its destined auxiliary track structure, in order to deviate and direct it toward the proper auxiliary track structure by means of the intermediate track switch means, effectuating its transmission from the direct path to the proper branch or angular path.

The clip selector means travels along on its destined switch track until it engages the cam-like structure 38 or 36 having a cam bump 39 or 37, which engages the extension 71 of the pin support means 68, thus causing the same to be compressed inwardly against the prongs 69 releasing the hump 70 from support on the dowel 67, the weight of the load 72 causing the said load to drop off and the pin elements 68 to become disengaged from the clip selector elements 40, thus a load will have been transported to its proper allocation or destination within a plant. The clip selector elements are pushed along further until they are either brought to an inactive portion from which they may be removed, or the propeller systems 12, 15 and 17 are made long enough in order to work the clip selector element off the tracks into some collector basket or utensil from which they may be picked up and used again with the pin element 68 to repeat the cycle of operation.

The relationship of the pulleys 52 and 57 as far as transmitting the proper motion is concerned to the track switch means 22 and 31, is arranged to assure complete motion inasmuch as the stop portions 35 and 28, 23 and 34 will limit the motion of the track switch means 31 and 22, and the rotatable arm being in contact with the clip selector means will be caused to travel a greater arcuate distance than the angular distance traversed by the switch means 31 and 22 so that either the proper reduction of transmission pulleys may be used, or a factor of safety may be utilized in having the rotatable arm effectuate the movement of the switch means as soon as possible. When the switch means can no longer travel the further movement of the rotatable arm 42 will cause the belt 54 to slip with respect to its frictional engagement of the pulley 57 causing no further motion. In other words, the movement will be effectuated by the frictional belting transmission and as soon as an obstacle or stop is met with by the track switch means, the frictional traction will be nullified and slippage will occur. When the track switch is thus set to move freely, the frictional engagement will be sufficient to motivate the track switch.

It is to be noted that the propeller means 17 and 15 each travel in counter-clockwise directions whereas the movement of the propeller unit 12 is clockwise.

Figure 5:
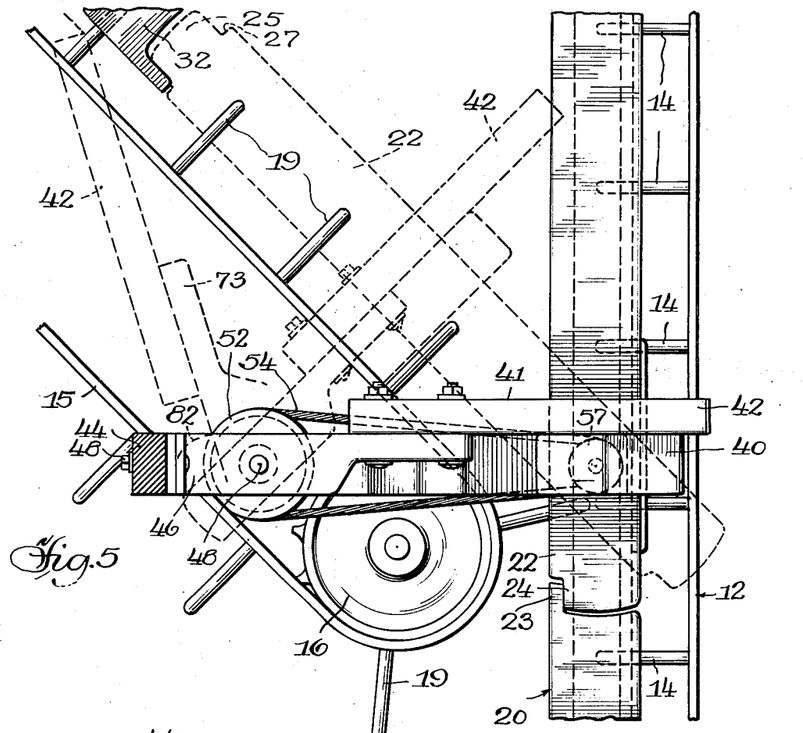
Fig. 5 is an enlarged top view showing the combined conveyor units working in concert to either convey a clip element on the primary trackage system, or on the angularly positioned trackage system, depending on whether the clip element actuates the rotating switch arm or not.
Figure 6:
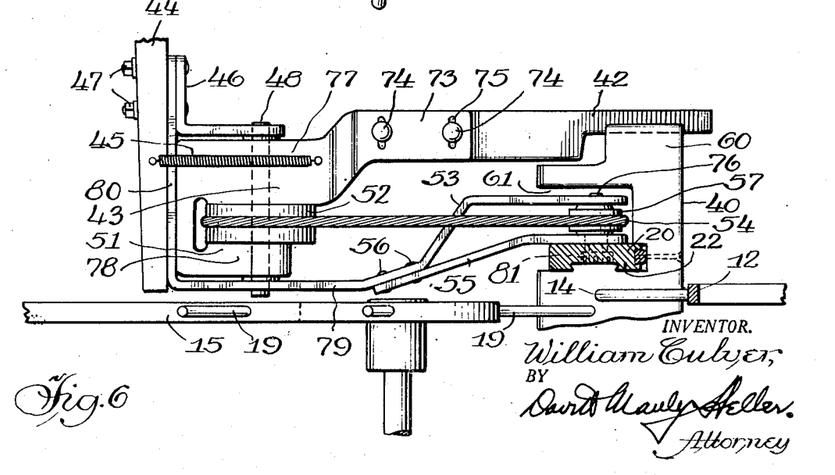
Fig. 6 is a front view of the mechanism and structure depicted in Figure 5.

A slightly modified form of structure is shown in Figures 5 and 6 where the overhead rotatable arm 42 is made as a separate element, and is secured to the support arm 73 having a U shaped housing portion designated 77 and 78 in order to hold rotatably the pulley 52 which rotates therewith, being fixed on the pivot pin 48 rotating freely in the support 46. The means for securing the arm 42 may be fastenings 74, slotted openings 75 being available for vertical or height adjustments. The lower support bracket 79 may be provided with an upward extending portion 80 and the rotating arm in each instance is provided with an arcuately cut away portion 82 in order to permit rotation counter-clockwise and at the same time offer a shoulder or abutment for its positive location in normal position, as indicated in Figure 5.

The bracket support extension 79 is provided with an upwardly bent portion 53, supporting a bent strap 55, secured by virtue of rivets 56, supporting the pulley 57, which is engaged by the traction belt 54; the said pulley being positioned so as to rotate with the shaft 76 which terminates in a reduced threaded extension engaged by the nut 81 counter-sunk therein, securing the track switch means 22 firmly, in order to be operable in unison with the pulley 57 when rotation is effectuated, that is at a time when the portion 60 of the clip selector element 40 engages the extension of the overhead arm 42 causing the same to be rotated.

The views of Figures 7 to 10 indicate a slightly modified structure of my invention, namely, wherein the same type of propellers are used, that is a main propeller 12 and branch propellers like 15 angularly disposed thereto, whereby the propeller pusher elements are adapted to engage simultaneously a clip selector element 40, and propel the same along depending on its destined movement controlled by the clip selector element and controlled either by the physical contact with a rotatable arm 42, or as in this particular instance closing an electrical circuit operating electro-magnetic solenoid means to effectuate the switching movement, or rotational movement, of the switch means 22.

Figures 7, 10:
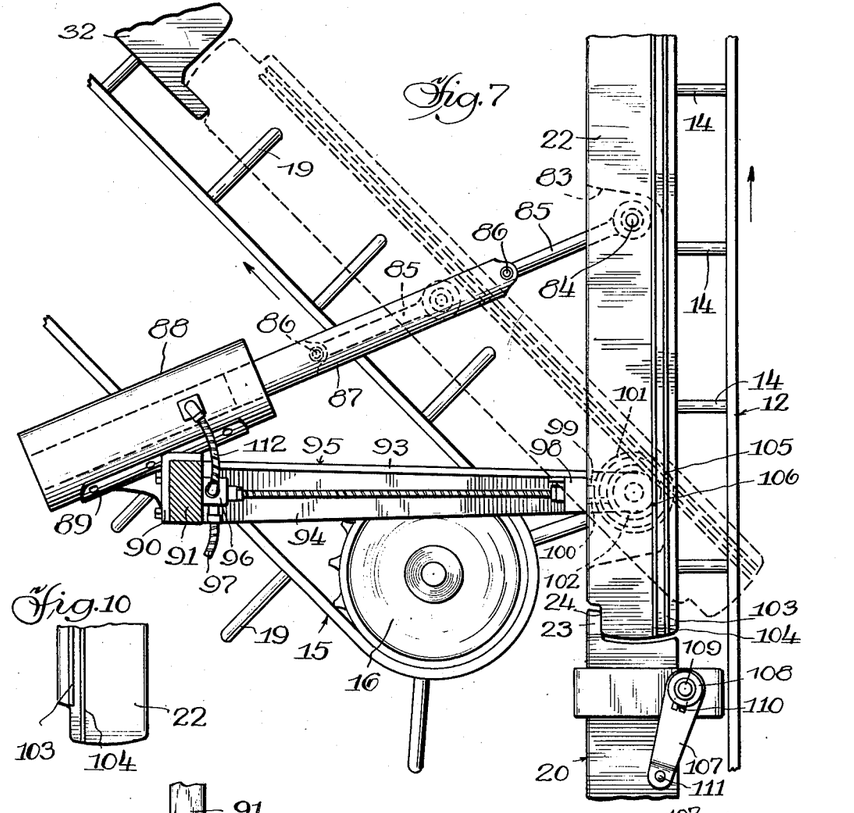
Fig. 7 is a view similar to Figure 5 with the exception that the track switching means is constructed to be operated by electro-magnetic solenoid means as distinguished from the physically contactable rotating switch arm structure indicated in Figure 5.
Fig. 10 is a fragmentary view of an end of the track switching means showing its contacts placed in a different position than that indicated in Figure 7.

In this case the switch means is, preferably, made of a dielectric or insulated material, and has a recess pocket 83 in which is mounted the link 85 pivotably secured at 84 and 86 to the electro-magnetic core 87, operating within the electro-magnetic solenoid 88, which is suitably energized when proper contacts are made; the said solenoid having an electrical connection 112 to an outlet box 96, from which also emanates the electrical conduit 97 to a distributor block 98, in which are secured the brushes 99 and 100 the province of which is to ride on the segments 101 and 102 which are insulated from one another; the said segments each being connected to electrical lineal contacts 103 and 104 imbedded in the track switching means 22.

The electro-magnetic solenoid is supported suitably on an upright 91 holding a bracket 90 which has a flange portion 89 secured to the solenoid by fastenings 92. The track switching means are supported on a bracket 95 having reinforcement ribs 93 and 94 for supporting the electrical conduit 97, and also for supporting the track switch means to operate rotatably thereupon. The track switch means 22 is caused to rotate angularly to the dotted position by means of suitable contacts bridging the gap between the lineal conduits 103 and 104 heretofore mentioned. The circuit is closed by the tongues or by the flexible and resilient link 107 which has a hub 108 secured to a pin 109 by means of set screw 110, it being provided with an electrical contact 111 which is sufficient to enter the space between the lineal conduits 103 and 104 bridging the gap therebetween, closing the circuit, energizing the electro-magnet 88 and causing the switch means 22 to be motivated to the dotted position establishing communication between its primary track and the auxiliary track with which it is contacted.

Figures 8, 9:
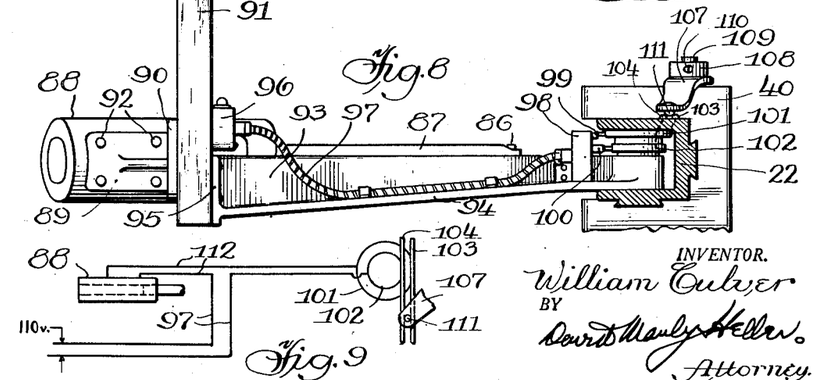
Fig. 8 is a front view of the view shown in Figure 7.
Fig. 9 is an electrical diagram showing the connection to a source of supply of the various contact elements to effectuate angular motivation of the track switching means.

The electrical circuit is clearly indicated in Figure 9 where it can be seen that the segments 101 and 102 are connected to one of each of the leads of the conduit means 97 the same branching off into conduits 112 which are connected to termini or binding posts for the termini of the electro-magnetic solenoid means 88, the same receiving its electrical energy from a source of current supply of 110 volts.

The embedded lineal conduits 103 and 104 may be positioned at different points on the track as exemplified in Figure 10 so that bridging of contacts will be established by the point 111 only when it happens to be set to the proper radial position in alignment with the lineal conduits on the particular track switch means that it is destined to energize and cause to produce the rotation of a particular track switch 22.

It is to be noted that the terminal 107 is adapted to be positioned adjustably, and radially, so as to contact embedded lineal conduits or contacts 103 and 104 embedded at different positions on the track switching means 22, at the same time it is to be noted that the terminal 107 is in a trailing position thus permitting the clip selector element 40 to be riding actually on the track switching means 22 before electrical contact is established, tending to motivate the track switch means; in other words, the track switch means will not be motivated except when the clip selector element is firmly positioned thereon and assured definitely that the clip selector element 40 fully governs the motivating action making the operation fool-proof.

The operation of my device is very simple, the clip selector element to which the pins carrying the load have been attached as shown in Figures 3 and 4 are each fed on to the initial terminus 21 of the trackage 20 and pushed along far enough manually until the pusher pins 14 take effect; from that time on, the action is automatic.

Figure 1:
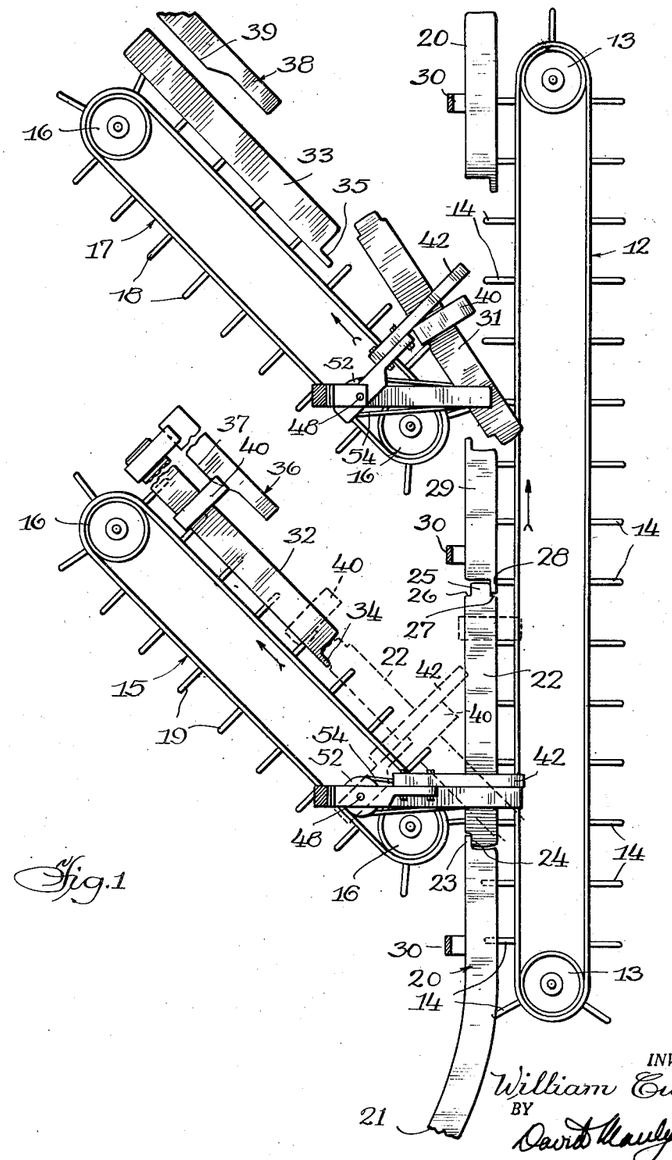
Fig. 1 represents a top view of the conveying mechanism and the angularly diverting structure utilized in my assorting system.

In the mechanical instance, as exemplified in Figure 1, the extension 60 on the clips 40 engages by physical contact the rotatable arm 42 that it encounters in its straight moving path, at which time it causes the rotatable switch arm to be motivated arcuately, simultaneously therewith transmitting rotatable motion to the switch means 22 or 31, or whatever switch means happens to be aligned with the particular rotatable arm, then the course or path of the clip selector element is deviated from its original straight forward path on the trackage 20 to trackage 33 or 32 depending on the switch means which has been motivated. When the clip selector element travels along on the auxiliary trackage 33 or 32 and encounters the cam releasing structure 36 or 38, the terminus 71 of the pin support 68 is actuated causing it and its load to become disengaged from the switch selector elements 40 dropping the load in a place of operation destined for it.

In the case of the modified structure, the clip selector element 40, effectuates transfer by its trailer terminal 107 by bridging the gap of the embedded lineal conduits 103 and 104 which are secured to commutator segments 105 and 106 upon which the brushes 99 and 100 operate for maintaining a closed circuit thus energizing the electro-magnetic solenoid 88 and effecting a pulling action at the pivotal point 84 motivating the switch means 22.

In all of the forms shown, a dual conveyor system is utilized at each track switching point so that the said dual conveyor system is provided with pusher elements which at the apex of their angularly positioned relationship simultaneously causes the pusher elements to engage the clip selector element and push it along depending on the path destined for that particular clip selector element, one of the conveyors dominating in controlling the further movement of the clip selector element depending on the distance the clip selector element has travelled away from the apex of the angularly related conveyor structure and dependent also on the motivation of the switch means governed entirely by the movement of the clip selector element, which either subjects itself to the continual pushing of the conveyor 12 or one of the auxiliary or angularly disposed conveyors 15, or 17 or any others that may be in a particular assorting circuit or mechanism.

I believe I have described rather succinctly the nature and the construction of my assorting system, and inasmuch as the same is susceptible of modifications and improvements, I hereby reserve the right to all modifications and improvements coming within the scope and spirit of my invention, as well as those embraced in the embodiment of the accompanying drawings, and also those falling within the purview of the foregoing description.

Having thus described and revealed my invention, what I claim as novel and desire to secure by Letters Patent, is:

1. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to be motivated angularly in coextensive relationship with the said auxiliary branch trackage structures; bracket means supporting the said track switch means, pivotal arm means mounted on the said bracket means provided with a switch arm portion, transmission means interconnecting the said pivotal arm means to the said track switch means to motivate the said track switch means, and load supporting selector means constructed to ride on the said trackage mechanism and provided with a contacting portion adapted to divert itself from the said main trackage structure to one of the said auxiliary branch trackage structures by virtue of intimate contact between the said contacting portion with the said switch arm portion.

2. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to be motivated angularly in coextensive relationship with the said auxiliary branch trackage structures; bracket means supporting the said track switch means, pivotal arm means mounted on the said bracket means provided with a switch arm portion, transmission means interconnecting the said pivotal arm means to the said track switch means to motivate the said track switch means, and load supporting selector means constructed to ride on the said trackage mechanism and provided with a contacting portion adapted to divert itself from the said main trackage structure to one of the said auxiliary branch trackage structures by virtue of intimate contact between the said contacting portion with the said switch arm portion, the said pivotal arm means being successively positioned in gradually lower positions commencing with the highest point where travel of the said load supporting selector means is initiated ranging gradually toward the lowest point where the said main trackage structure terminates, the said diverting means on the said load supporting selector means consisting of extensions of different magnitudes to cooperatively and selectively engage a particular pivotal arm of the said pivotal arm means.

3. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to be motivated angularly in coextensive relationship with the said auxiliary branch trackage structures; bracket means supporting the said track switch means, pivotal arm means mounted on the said bracket means provided with a switch arm portion, transmission means interconnecting the said pivotal arm means to the said track switch means to motivate the said track switch means, and load supporting selector means constructed to ride on the said trackage mechanism and provided with a contacting portion adapted to divert itself from the said main trackage structure to one of the said auxiliary branch trackage structures by virtue of intimate contact between the said contacting portion with the said switch arm portion, the said trackage mechanism being provided with dovetailed keyway means on its under surface, the said load supporting selector means being provided with dovetailed key means in sliding engagement with the said dovetailed keyway means.

4. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to be motivated angularly in coextensive relationship with the said auxiliary branch trackage structures; bracket means supporting the said track switch means, pivotal arm means mounted on the said bracket means, transmission means interconnecting the said pivotal arm means to the said track switch means to motivate the said track switch means, and load supporting selector means constructed to ride on the said trackage mechanism and provided with diverting means adapted to divert itself from the said main trackage structure to one of the said auxiliary branch trackage structures, the said pivotal arm means being successively positioned in gradually lower positions commencing with the highest point where travel of the said load supporting selector means is initiated ranging gradually toward the lowest point where the said main trackage structure terminates, the said diverting means on the said load supporting selector means consisting of extensions of different magnitudes to cooperatively and selectively engage a particular pivotal arm of the said pivotal arm means, the said trackage mechanism being provided with dovetailed keyway means on its under surface, the said load supporting selector means being provided with dovetailed key means in sliding engagement with the said dovetailed keyway means.

5. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to be motivated angularly in coextensive relationship with the said auxiliary branch trackage structures; bracket means supporting the said track switch means, pivotal arm means mounted on the said bracket means provided with a switch arm portion, transmission means interconnecting the said pivotal arm means to the said track switch means to motivate the said track switch means, and load supporting selector means constructed to ride on the said trackage mechanism and provided with a contacting portion adapted to divert itself from the said main trackage structure to one of the said auxiliary branch trackage structures by virtue of intimate contact between the said contacting portion with the said switch arm portion, the said trackage mechanism being provided with dovetailed alignment keyway means on the free edges thereof, the said load supporting selector means being provided with dovetailed alignment key means extending forwardly thereof to engage the said dovetailed alignment keyway means to assure coextensive alignment of the said track switch means with the component elements of the said trackage mechanism.

6. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to be motivated angularly in coextensive relationship with the said auxiliary branch trackage structures; bracket means supporting the said track switch means, pivotal arm means mounted on the said bracket means, transmission means interconnecting the said pivotal arm means to the said track switch means to motivate the said track switch means, and load supporting selector means constructed to ride on the said trackage mechanism and provided with diverting means adapted to divert itself from the said main trackage structure to one of the said auxiliary branch trackage structures, the said pivotal arm means being successively positioned in gradually lower positions commencing with the highest point where travel of the said load supporting selector means is initiated ranging gradually toward the lowest point where the said main trackage structure terminates, the said diverting means on the said load supporting selector means consisting of extensions of different magnitudes to cooperatively and selectively engage a particular pivotal arm of the said pivotal arm means, the said trackage mechanism being provided with dovetailed alignment keyway means on the free edges thereof, the said load supporting selector means being provided with dovetailed alignment key means extending forwardly thereof to engage the said dovetailed alignment keyway means to assure coextensive alignment of the said track switch means with the component elements of the said trackage mechanism.

7. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to be motivated angularly in coextensive relationship with the said auxiliary branch trackage structures; bracket means supporting the said track switch means, pivotal arm means mounted on the said bracket means provided with a switch arm portion, transmission means interconnecting the said pivotal arm means to the said track switch means to motivate the said track switch means, and load supporting selector means constructed to ride on the said trackage mechanism and provided with a contacting portion adapted to divert itself from the said main trackage structure to one of the said auxiliary branch trackage structures by virtue of intimate contact between the said contacting portion with the said switch arm portion, the said trackage mechanism being provided with dovetailed keyway means on its under surface, the said load supporting selector means being provided with dovetailed key means in sliding engagement with the said dovetailed keyway means, the said trackage mechanism being provided with dovetailed alignment keyway means on the free edges thereof, the said load supporting selector means being provided with dovetailed alignment key means extending forwardly thereof to engage the said dovetailed alignment keyway means to assure coextensive alignment of the said track switch means with the component elements of the said trackage mechanism.

8. In an assorting mechanism including a trackage mechanism having a multiplicity of auxiliary branch trackage structures angularly related to a main trackage structure, propelling conveyor means including an auxiliary propelling conveyor mechanism associated with each of the said multiplicity of auxiliary branch trackage structures cooperating with distributing propelling conveyor means associated with the said main trackage structure, track switch means articulately secured in coextensive relationship with the said main trackage structure and adapted to the motivated angularly in coextensive relationship with the said auxiliary branch trackage structures; bracket means supporting the said track switch means, pivotal arm means mounted on the said bracket means, transmission means interconnecting the said pivotal arm means to the said track switch means to motivate the said track switch means, and load supporting selector means constructed to ride on the said trackage mechanism and provided with diverting means adapted to divert itself from the said main trackage structure to one of the said auxiliary branch trackage structures, the said pivotal arm means being successively positioned in gradually lower positions commencing with the highest point where travel of the said load supporting selector means is initiated ranging gradually toward the lowest point where the said main trackage structure terminates, the said diverting means on the said load supporting selector means consisting of extensions of different magnitudes to cooperatively and selectively engage a particular pivotal arm of the said pivotal arm means, the said trackage mechanism being provided with dovetailed keyway means on its under surface, the said load supporting selector means being provided with dovetailed key means in sliding engagement with the said dovetailed keyway means, the said trackage mechanism being provided with dovetailed alignment keyway means on the free edges thereof, the said load supporting selector means being provided with dovetailed alignment key means extending forwardly thereof to engage the said dovetailed alignment keyway means to assure coextensive alignment of the said track switch means with the component elements of the said trackage mechanism.

WILLIAM CULVER.

REFERENCES CITED

The following references are of record in the file of this patent:

UNITED STATES PATENTS

| Number | Name | Date |
| --- | --- | --- |
| 1,297,680 | Hanak | Mar. 18, 1919 |
| 1,554,765 | Shaffer | Sept. 22, 1925 |